(12) United States Patent
Ohashi

(10) Patent No.: US 12,466,411 B2
(45) Date of Patent: Nov. 11, 2025

(54) IN-VEHICLE COMPUTER

(71) Applicant: TOYOTA JIDOSHA KABUSHIKI KAISHA, Toyota (JP)

(72) Inventor: Kosuke Ohashi, Kiyosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 18/635,369

(22) Filed: Apr. 15, 2024

(65) Prior Publication Data

US 2025/0083678 A1    Mar. 13, 2025

(30) Foreign Application Priority Data

Sep. 12, 2023   (JP) .................... 2023-147534

(51) Int. Cl.
*B60W 30/18*     (2012.01)
*B60W 30/182*    (2020.01)

(52) U.S. Cl.
CPC .................. *B60W 30/182* (2013.01)

(58) Field of Classification Search
CPC ..... B60W 30/182; G06F 9/544; G06F 9/5016
USPC ....................................... 701/36, 48
See application file for complete search history.

(56) References Cited

FOREIGN PATENT DOCUMENTS

JP       H05-217005 A      8/1993

*Primary Examiner* — Hai H Huynh
(74) *Attorney, Agent, or Firm* — SoraIP, Inc.

(57) ABSTRACT

An in-vehicle computer includes an execution device and a storage device including a RAM. The storage device stores programs of a plurality of applications to be executed by the execution device. The RAM stores temporary data of the applications. When the execution device determines that the RAM is running out of capacity, the execution device compresses the temporary data of the application stored in the RAM. At this time, the execution device compresses only the temporary data of the application other than the application that has been activated and is being executed by the execution device.

5 Claims, 3 Drawing Sheets

IN-VEHICLE COMPUTER

CROSS-REFERENCE TO RELATED APPLICATION

This application claims priority to Japanese Patent Application No. 2023-147534 filed on Sep. 12, 2023, incorporated herein by reference in its entirety.

BACKGROUND

1. Technical Field

The present disclosure relates to in-vehicle computers.

2. Description of Related Art

Japanese Unexamined Patent Application Publication No. H05-217005 (JP H05-217005 A) discloses a microcomputer system. The microcomputer system includes two types of memories, a random access memory (RAM) and a read-only memory (ROM). When there is not enough memory available, the microcomputer system frees up the memory capacity by compressing programs.

SUMMARY

In-vehicle computers with RAM and ROM may run out of memory while an application is running. When there is not enough memory available, data in the RAM is compressed in order to free up the memory space. In order to execute the application again, data of the application needs to be decompressed into the RAM. Such data compression and decompression increase the processing load on the in-vehicle computer.

There is a demand for an in-vehicle computer that can reduce degradation in performance due to an increase in processing load.

Means for solving the above problem and its functions and effects will be described below.

An in-vehicle computer for solving the above problem includes an execution device and a storage device including a RAM.

In the in-vehicle computer, the storage device stores programs of a plurality of applications to be executed by the execution device.

The RAM stores temporary data for executing the applications.

The execution device is configured to switch a foreground application and a background application in such a way that the application that has been activated and is being executed out of the applications becomes the foreground application and the application other than the foreground application becomes the background application, and when determination is made that the RAM is running out of capacity, compress the temporary data of the background application without compressing the temporary data of the foreground application out of the temporary data stored in the RAM.

The in-vehicle computer can reduce an increase in frequency of compression and decompression of the temporary data. As a result, it is possible to reduce degradation in performance of the in-vehicle computer.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of In-Vehicle Computer 100

Figure 1:
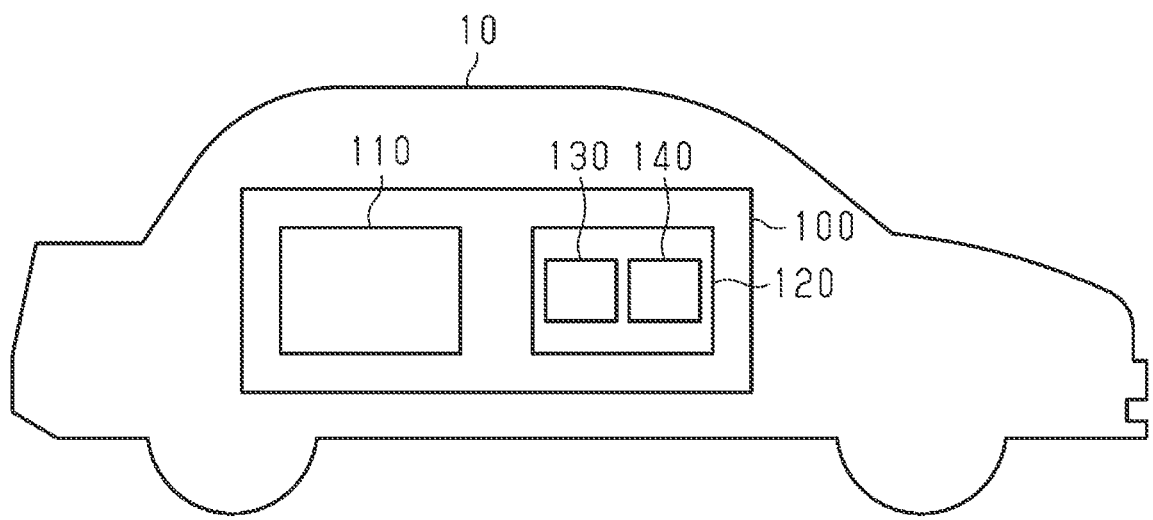
FIG. 1 is a schematic diagram illustrating a configuration of an in-vehicle computer according to an embodiment.

Hereinafter, an embodiment of the in-vehicle computer 100 will be described with reference to FIG. 1 to FIG. 5. As shown in FIG. 1, an in-vehicle computer 100 is mounted on a vehicle 10. The in-vehicle computer 100 includes an execution device 110 and a storage device 120. The storage device 120 includes a RAM 130 and a ROM 140.

The storage device 120 stores programs of a plurality of applications. The execution device 110 can execute a program of an application stored in the storage device 120.

Compressing Temporary Data of Background Application BG by Execution Device 110

The RAM 130 stores temporary data for executing the applications by the execution device 110.

Of the plurality of applications, an application that has been activated and is being executed by the execution device 110 is set to a foreground application FG. Among a plurality of applications, an application other than the foreground application FG is set to the background application BG.

The execution device 110 determines whether the RAM 130 is running out of capacity. When it is determined that the RAM 130 is running out of capacity, the execution device 110 compresses the temporary data of the background application BG stored in the RAM 130.

Decompression of Compressed Temporary Data into RAM 130 by Execution Device 110

When the execution device 110 activates and executes the background application BG in which the temporary data is compressed, the execution device 110 decompresses the compressed temporary data into a RAM 130.

Saving Compressed Temporary Data into ROM 140 by Execution Device 110

The execution device 110 moves the temporary data of the application compressed in RAM 130 to ROM 140 and saves the temporary data. At this time, the execution device 110 deletes the temporary data stored in RAM 130.

Figure 2:
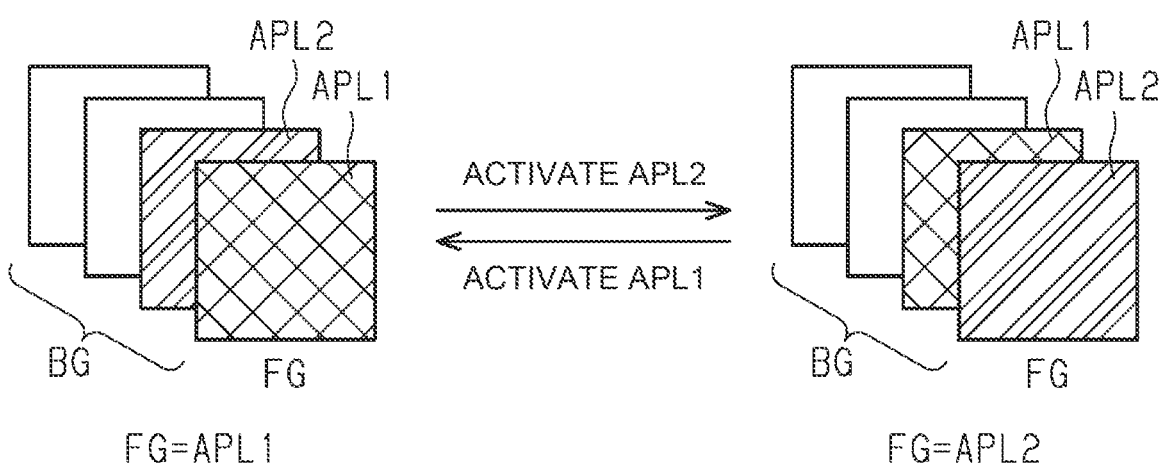
FIG. 2 is a diagram illustrating switching between foreground and background applications.

Switching Between Foreground Application FG and Background Application BG Between Applications FIG. 2 illustrates switching between a foreground application FG and a background application BG executed by the execution device 110.

The execution device 110 sets one of the plurality of applications that has been activated and is being executed as the foreground application FG. On the other hand, the execution device 110 sets an application other than the foreground application FG among the plurality of applications to the background application BG.

For example, when the execution device 110 activates and executes the first application APL1, the first application APL1 of the plurality of applications becomes the foreground application FG as illustrated on the left side of FIG. 2. Next, when the execution device 110 activates and executes the second application APL2, the second application APL2 among the plurality of applications is switched to the foreground application FG as illustrated on the right side of FIG. 2. Then, among the plurality of applications, another application is switched to the background application BG. When the execution device 110 activates and executes the first application APL1 again, the first application APL1 of the plurality of applications is switched to the foreground application FG as shown on the left side of FIG. 2. Then, among the plurality of applications, another application is switched to the background application BG.

Figure 3:
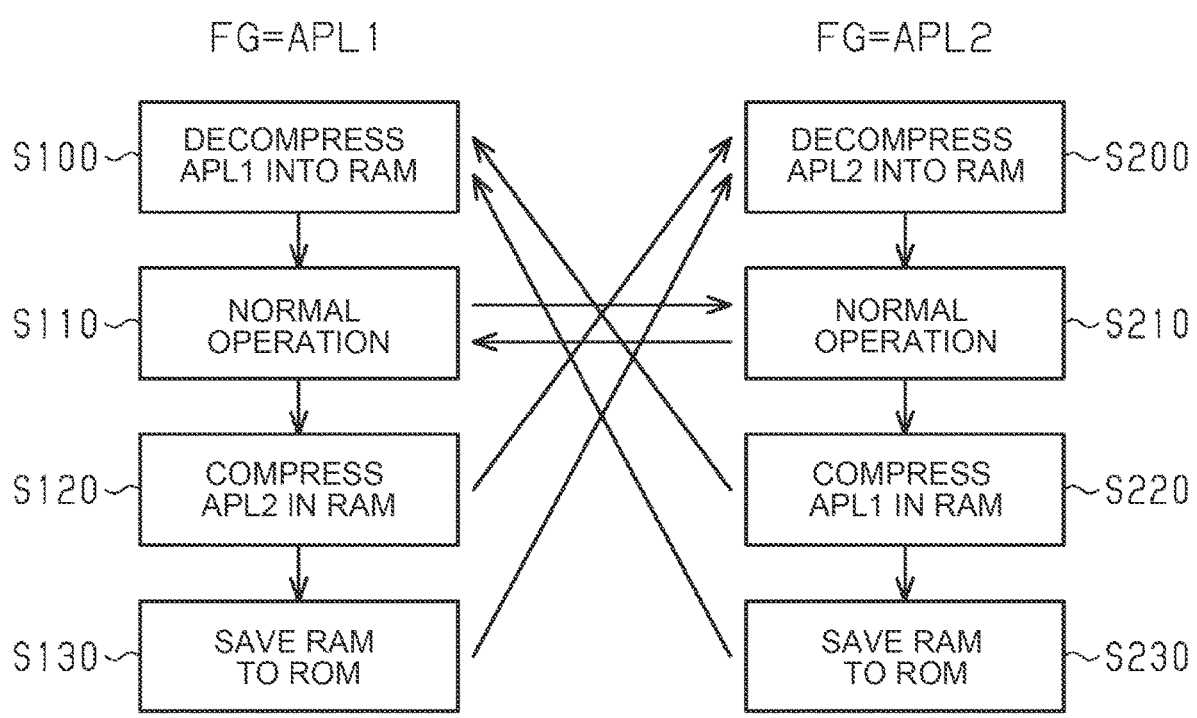
FIG. 3 is a flow chart illustrating the handling of RAM associated with switching between foreground and background applications between two applications.

FIG. 3 is a flow chart illustrating data handling of the RAM 130 associated with switching of two applications between the foreground application FG and the background application BG. The two applications are a first application APL1 and a second application APL2.

A flowchart for the execution device 110 executing the first application APL1 as a foreground application FG is shown on the left side of FIG. 3. In S100, the execution device 110 activates the first application APL1 by decompressing the temporary data of the first application APL1 into the RAM 130.

When the temporary data of the first application APL1 is decompressed into the RAM 130, the execution device 110 executes the first application APL1 in S110. In S110, when the execution device 110 is executing the first application APL1, the execution device 110 determines whether the RAM 130 memory usage exceeds the threshold value X. The threshold value X is a threshold value for determining that the RAM 130 is running out of capacity based on the fact that the memory usage amount exceeds the threshold value X. Further, the execution device 110 determines whether the first predetermined time T1 has elapsed since the second application APL2 became the background application BG. When the execution device 110 determines that both conditions are satisfied, in S120, the execution device 110 compresses the temporary data of the second application APL2 decompressed into the RAM 130.

In S120, the execution device 110 determines whether the temporary data of the second application APL2 has remained compressed for the second predetermined time T2. When the execution device 110 determines that this condition is satisfied, in S130, the execution device 110 saves the compressed temporary data of the second application APL2 to ROM 140 and deletes the temporary data from RAM 130.

The execution device 110 switches the second application APL2 running as the background application BG to the foreground application FG for the second application APL2 when it is requested to switch to the foreground application FG.

When the execution device 110 activates and executes the second application APL2 while S110 is being processed, the process proceeds to S210. In S210, the second application APL2 is executed as a foreground application FG by the execution device 110. The first application APL1 is then switched to the background application BG.

When the execution device 110 activates and executes the second application APL2 while S120 is being processed, the process proceeds to S200. In S200, the execution device 110 activates the second application APL2 by decompressing the compressed temporary data of the second application APL2 into the RAM 130.

When the temporary data of the second application APL2 is decompressed into the RAM 130, the execution device 110 executes the second application APL2 in S210. When the execution device 110 activates and executes the second application APL2 from the state of S130, the process proceeds to S200. In S200, the execution device 110 activates the second application APL2 by decompressing the compressed temporary data of the second application APL2 saved in the ROM 140 into the RAM 130.

When the temporary data of the second application APL2 is decompressed into the RAM 130, the execution device 110 executes the second application APL2 in S210. Next, a flow chart when the execution device 110 executes the second application APL2 as a foreground application FG is shown on the right side of FIG. 3. In S200, the execution device 110 activates the second application APL2 by decompressing the temporary data of the second application APL2 into the RAM 130.

When the temporary data of the second application APL2 is decompressed into the RAM 130, the execution device 110 executes the second application APL2 in S210. In S210, when the execution device 110 is executing the second application APL2, the execution device 110 determines whether the RAM 130 memory usage exceeds the threshold value X. The threshold value X is a threshold value for determining that the RAM 130 is running out of capacity based on the fact that the memory usage amount exceeds the threshold value X. Further, the execution device 110 determines whether the first predetermined time T1 has elapsed since the first application APL1 became the background application BG. When the execution device 110 determines that both conditions are satisfied, in S220, the execution device 110 compresses the temporary data of the first application APL1 decompressed into the RAM 130.

In S220, the execution device 110 determines whether the temporary data of the first application APL1 has remained compressed for the second predetermined time T2. When the execution device 110 determines that this condition is satisfied, in S230, the execution device 110 saves the compressed temporary data of the first application APL1 to the ROM 140 and deletes the temporary data from RAM 130.

The execution device 110 switches the first application APL1 running as the background application BG to the foreground application FG for the first application APL1 when it is requested to switch to the foreground application FG.

When the execution device 110 activates and executes the first application APL1 from the state where S210 is being processed, the process proceeds to S110. Upon moving to S110, the first application APL1 is executed as a foreground application FG on the execution device 110. The second application APL2 is then switched to the background application BG.

When the execution device 110 activates and executes the first application APL1 from S220 process, the process proceeds to S100. In S100, the execution device 110 activates the first application APL1 by decompressing the compressed temporary data of the first application APL1 into a RAM 130.

When the temporary data of the first application APL1 is decompressed into the RAM 130, the execution device 110 executes the first application APL1 in S110. When the execution device 110 activates and executes the first application APL1 from S230 process, the process proceeds to S100. In S100, the execution device 110 activates the first application APL1 by decompressing the compressed temporary data of the first application APL1 saved in ROM 140 into the RAM 130.

When the temporary data of the first application APL1 is decompressed into the RAM 130, the execution device 110 executes the first application APL1 in S110.

Example of Switching Between Foreground Application FG and Background Application BG in In-Vehicle Computer 100

Figure 4:
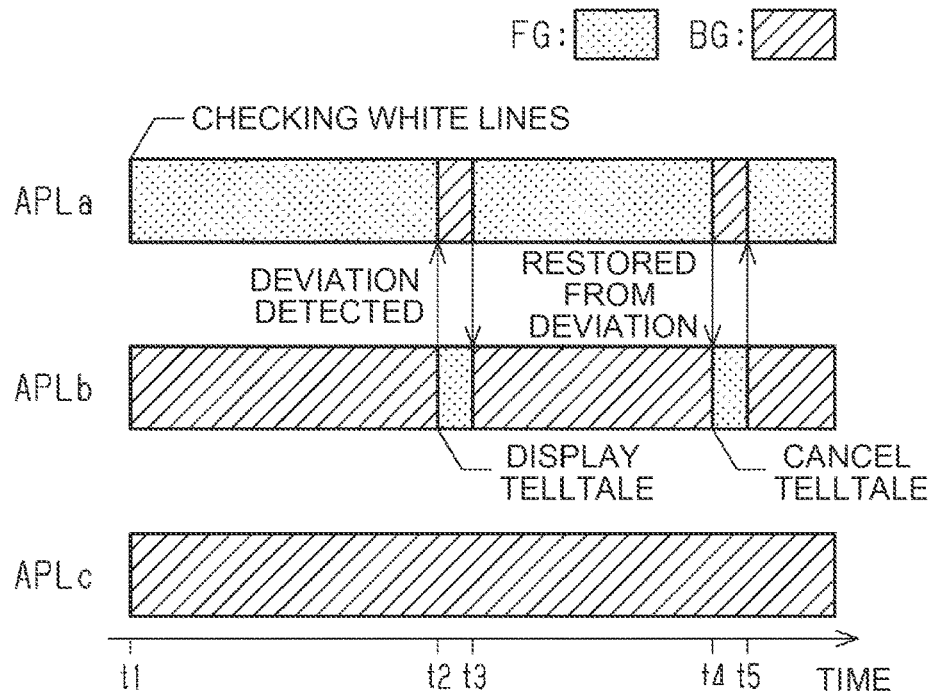
FIG. 4 is a diagram illustrating switching of three applications between foreground and background applications in a traveling vehicle.
Figure 5:
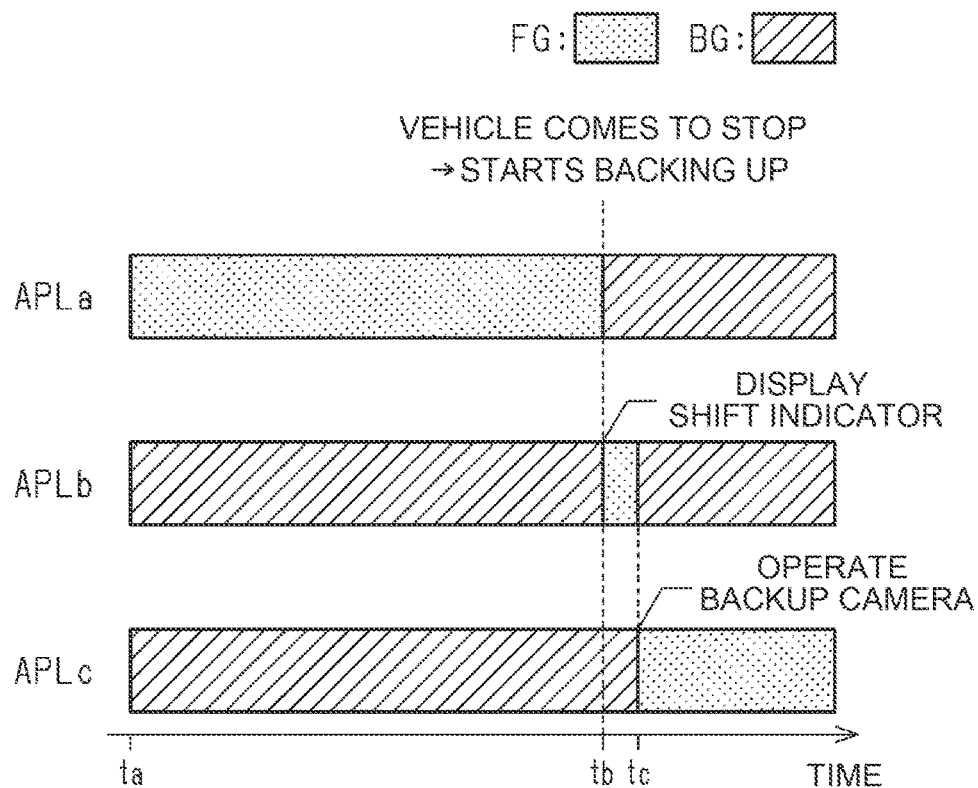
FIG. 5 is a diagram illustrating switching of three applications between foreground application and background applications when a traveling vehicle comes to a stop and starts to back up.

FIG. 4 and FIG. 5 show exemplary switching between the foreground application FG and the background application BG in the in-vehicle computer 100 in which a plurality of applications is running. For example, the plurality of applications that is executed by the execution device 110 includes an application APLa that detects a lane on a road, an application APLb that displays a meter, and an application APLc that assists in parking.

FIG. 4 shows switching between the foreground application FG and the background application BG in the running vehicle 10.

In the examples shown in FIGS. 4 and 5, the execution device 110 decompresses three application APLa, the application APLb, and the application APLc into the RAM 130 and executes them.

The application APLa is an application that suppresses the vehicle 10 from deviating from the lane by detecting a white line on the road. The application APLb is an application that transmits information to drivers of the vehicle 10 by displaying various telltales on an instrument panel or the like. The application APLc is an application that assists in parking of the vehicle 10 by, for example, activating a backup camera when the vehicle 10 backs up.

During traveling, such as from the time t1 to the time t2 in FIG. 4, the execution device 110 activates and executes the application APLa in order to recognize the white line. As a result, the application APLa becomes the foreground application FG. The application APLb and the application APLc, which are other applications, serve as background application BG.

In the time t2, when the execution device 110 detects that it has deviated from the lane across the white line, the execution device 110 activates and executes the application APLb in order to execute the tell tail indication. As a result, the application APLb becomes the foreground application FG. The application APLa and the application APLc, which are other applications, serve as background application BG.

In the time t3, in order to recognize the white line again, the execution device 110 activates and executes the application APLa. As a result, the application APLa becomes the foreground application FG. The application APLb and the application APLc, which are other applications, serve as background application BG.

When the execution device 110 detects restoration from the lane deviation in the time t4, the execution device 110 activates and executes the application APLb in order to cancel the tell-tail indication. As a result, the application APLb becomes the foreground application FG. The application APLa and the application APLc, which are other applications, serve as background application BG.

In the time t5, in order to recognize the white line again, the execution device 110 activates and executes the application APLa. As a result, the application APLa becomes the foreground application FG. The application APLb and the application APLc, which are other applications, serve as background application BG.

FIG. 5 illustrates switching between the foreground application FG and the background application BG when the traveling vehicle 10 are stopped and transitioned to the background.

Also in FIG. 5, similarly to FIG. 4, the application APLa is an application that suppresses the vehicle 10 from deviating from the lane by detecting a white line on the road. The application APLb is an application that transmits information to drivers of the vehicle 10 by displaying various telltales on an instrument panel or the like. The application APLc is an application that supports parking of the vehicle 10 by, for example, operating a backup camera when the vehicle 10 backs up.

During traveling, such as from the time ta to the time tb in FIG. 5, the execution device 110 activates and executes the application APLa in order to recognize the white line. As a result, the application APLa becomes the foreground application FG. The application APLb and the application APLc, which are other applications, serve as background application BG.

In the time tb, in order for the execution device 110 to execute the shift indicator indication when stopping the vehicle 10, the execution device 110 activates and executes the application APLb. As a result, the application APLb becomes the foreground application FG. The application APLa and the application APLc, which are other applications, serve as background application BG.

In the time tc, when the vehicle 10 transitions from the stopped state to the backing-up state, in order for the execution device 110 to activate the backup camera, the execution device 110 activates and executes the application APLc. As a result, APLc becomes the foreground application FG. The application APLa and the application APLb, which are other applications, serve as background application BG.

Operations of Present Embodiment

In the in-vehicle computer 100, the execution device 110 executes a program of a desired application from programs of a plurality of applications stored in the storage device 120. When it is determined that the RAM 130 is running out of capacity, the execution device 110 compresses the temporary data of the application stored in RAM 130. At this time, the execution device 110 does not compress the temporary data of the foreground application FG that has been activated and is being executed out of the plurality of applications. Then, the execution device 110 compresses the temporary data of the background application BG other than the foreground application FG among the plurality of applications.

Effects of Present Embodiment (1) The foreground application FG that is running is likely to continue to run and use temporary data. The in-vehicle computer 100 neither compress nor decompress the temporary data of the foreground application FG being executed. When the temporary data that is highly likely to be used is compressed, the frequency of compression and decompression increases, and the processing load of the in-vehicle computer 100 increases. On the other hand, according to the in-vehicle computer 100 described above, it is possible to prevent the frequency of compression and decompression of the temporary data from increasing. As a result, it is possible to reduce degradation in performance of the in-vehicle computer 100.

(2) When it is determined that the RAM 130 is running out of capacity, the execution device 110 determines whether the first predetermined time T1 has elapsed since each background application BG became the background application BG. At this time, the temporary data of the application for which the first predetermined time T1 has not elapsed since it became the background application BG is not compressed. On the other hand, the temporary data of the application for which the first predetermined time T1 has elapsed since it became the background application BG is compressed. As a result, the temporary data of the application temporarily becoming the background application BG is not compressed and decompressed. That is, compression and decompression of temporary data are not performed for frequently used applications. Therefore, it is possible to further suppress an increase in the frequency of compression and decompression of the temporary data.

(3) The storage device 120 further includes a ROM 140. The execution device 110 saves the temporary data that has remained compressed for the second predetermined time T2 from RAM 130 into ROM 140. The execution device 110 may remove temporary data from RAM 130 for applications that remain in the background application BG for a long time. As a result, the usage of RAM 130 can be reduced. As a consequence, it is possible to secure RAM 130 space and reduce the frequency of compression and decompression of the temporary data by the execution device 110.

(4) When requested to switch an application that is a background application BG to the foreground application FG, the execution device 110 switches the application to the foreground application FG. At this time, when the temporary data associated with the execution of the application is compressed in RAM 130, the execution device 110 decompresses the temporary data into RAM 130. As a result, the execution device 110 can execute an application serving as a background application BG as a foreground application FG.

Modifications

The present embodiment can be realized with the following modifications. The present embodiment and the following modifications can be combined with each other within a technically consistent range to be realized.

The execution device 110 may determine that the RAM 130 is running out of capacity. At this time, of the temporary data stored in the RAM 130, the execution device 110 compresses only the temporary data of the application for which the first predetermined time T1 has elapsed since it became the background application BG. On the other hand, the execution device 110 may compress the temporary data regardless of whether the first predetermined time T1 has elapsed since the application became the background application BG.

The execution device 110 determines whether the first predetermined time T1 has elapsed since each background application BG became the background application BG. In the in-vehicle computer 100, the first predetermined time T1 at this time may be individually set for each application.

The execution device 110 saves the temporary data that has remained compressed for the second predetermined time T2 from the RAM 130 into the ROM 140. The execution device 110 does not necessarily have to execute the process of causing ROM to compare the temporary data.

The execution device 110 determines whether the temporary data of each compressed background application BG has remained compressed for a second predetermined time T2. In the in-vehicle computer 100, the second predetermined time T2 at this time may be individually set for each application.

What is claimed is:

1. An in-vehicle computer comprising:
an execution device; and a storage device including a random access memory, wherein
the storage device stores programs of a plurality of applications to be executed by the execution device,
the random access memory stores temporary data for executing the applications, and
the execution device is configured to
switch a foreground application and a background application in such a way that the application that has been activated and is being executed out of the applications becomes the foreground application and the application other than the foreground application becomes the background application, and
when determination is made that the random access memory is running out of capacity, compress the temporary data of the background application without compressing the temporary data of the foreground application out of the temporary data stored in the random access memory.

2. The in-vehicle computer according to claim 1, wherein when determination is made that the random access memory is running out of capacity, the execution device compresses only the temporary data of the application for which a predetermined time has elapsed since the application became the background application out of the temporary data stored in the random access memory.

3. The in-vehicle computer according to claim 2, wherein:
the storage device further includes a read-only memory; and
the execution device saves the temporary data that has remained compressed for a predetermined time from the random access memory into the read-only memory.

4. The in-vehicle computer according to claim 1, wherein when a request is made to switch the application running as the background application from the background application to the foreground application, the execution device switches the requested application to the foreground application, and decompresses the temporary data associated with execution of the application into the random access memory.

5. The in-vehicle computer according to claim 1, wherein the applications include an application that detects a lane on a road, an application that displays a meter, and an application that assists in parking.

* * * * *